United States Patent
Romines

(10) Patent No.: US 10,345,431 B1
(45) Date of Patent: Jul. 9, 2019

(54) DUAL POLARIZATION RADAR SYSTEMS AND METHODS

(71) Applicant: Baron Services, Inc., Huntsville, AL (US)

(72) Inventor: James H. Romines, Huntsville, AL (US)

(73) Assignee: Baron Services, Inc., Huntsville, AL (US)

(*) Notice: Subject to any disclaimer, the term of this patent is extended or adjusted under 35 U.S.C. 154(b) by 300 days.

(21) Appl. No.: 15/177,440

(22) Filed: Jun. 9, 2016

Related U.S. Application Data

(60) Provisional application No. 62/173,232, filed on Jun. 9, 2015.

(51) Int. Cl.
  *G01S 7/02* (2006.01)
  *G01S 7/282* (2006.01)

(52) U.S. Cl.
  CPC ............ *G01S 7/024* (2013.01); *G01S 7/282* (2013.01)

(58) Field of Classification Search
  CPC . H01P 1/165; H01P 1/17; G01S 7/024; G01S 7/282; G01S 7/285; G01S 13/887; G01S 13/888
  See application file for complete search history.

(56) References Cited

U.S. PATENT DOCUMENTS

| | | | | |
|---|---|---|---|---|
| 3,742,506 A * | 6/1973 | Wilkinson | ............... | H01Q 3/28 342/362 |
| 3,827,051 A * | 7/1974 | Foldes | .................... | H01Q 21/24 333/117 |
| 4,231,000 A * | 10/1980 | Schuegraf | ............... | H01P 1/165 333/109 |
| 4,308,541 A * | 12/1981 | Frosch | .................... | H01P 1/161 342/363 |
| 4,323,898 A * | 4/1982 | Barnes | .................... | G01S 7/024 342/188 |
| 4,755,828 A * | 7/1988 | Grim | ........................ | H01P 1/165 333/21 A |
| RE32,835 E * | 1/1989 | Howard | .................... | H01P 1/17 333/21 A |
| 4,903,037 A * | 2/1990 | Mitchell | .................. | H01P 1/165 333/135 |
| 5,500,646 A * | 3/1996 | Zrnic | ....................... | G01S 7/024 342/188 |
| 5,764,182 A * | 6/1998 | Durand | ................... | G01S 7/024 342/188 |
| 6,243,036 B1 * | 6/2001 | Chadwick | ............... | G01S 7/025 342/175 |

(Continued)

*Primary Examiner* — Peter M Bythrow
(74) *Attorney, Agent, or Firm* — Maynard Cooper & Gale, P.C.; Jon E. Holland

(57) ABSTRACT

A dual polarized radar system transmits a waveform having energy polarized in a direction to permit the waveform to be separately received by orthogonally positioned waveguides. Specifically, receivers are able to separately measure a vertically polarized component of the returns and a horizontally polarized component of the returns without requiring the transmitter to divide the transmit signal across polarization angles. Thus, components for dividing the transmit signal and calibrating the system to account for inaccuracies resulting from such division can be eliminated, thereby reducing the complexity and cost of the radar system.

11 Claims, 12 Drawing Sheets

(56) References Cited

U.S. PATENT DOCUMENTS

| | | | | |
|---|---|---|---|---|
| 6,377,202 B1* | 4/2002 | Kropfli | ............... | G01S 7/024 342/26 R |
| 6,967,612 B1* | 11/2005 | Gorman | ............... | G01S 7/024 342/175 |
| 7,385,552 B2* | 6/2008 | Archer | ............... | G01S 13/887 342/179 |
| 7,492,303 B1* | 2/2009 | Levitan | ............... | G01S 7/024 342/188 |
| 7,746,267 B2* | 6/2010 | Raney | ............... | G01S 7/026 342/188 |
| 7,898,459 B2* | 3/2011 | Venkatachalam | ....... | G01S 7/025 342/26 R |
| 8,264,398 B2* | 9/2012 | Kamo | ............... | G01S 7/025 342/70 |
| 8,525,616 B1* | 9/2013 | Shaw | ............... | H01P 1/173 333/126 |
| 8,665,144 B2* | 3/2014 | Venkatachalam | ....... | G01S 7/025 342/188 |
| 9,097,805 B2 | 8/2015 | Balaji et al. | | |
| 9,335,407 B2* | 5/2016 | Bowring | ............... | G01S 7/024 |
| 2004/0119635 A1* | 6/2004 | Edvardsson | .......... | G01F 23/284 342/124 |
| 2007/0052576 A1* | 3/2007 | Hausner | ............... | G01S 7/024 342/22 |
| 2007/0222661 A1* | 9/2007 | Stagliano, Jr. | .......... | G01S 7/025 342/26 R |
| 2008/0284636 A1* | 11/2008 | Hausner | ............... | G01V 3/12 342/22 |
| 2009/0224964 A1* | 9/2009 | Raney | ............... | G01S 7/026 342/25 F |
| 2010/0027737 A1* | 2/2010 | Mostov | ............... | G01S 7/024 378/10 |
| 2016/0209506 A1* | 7/2016 | Longstaff | ............... | G01S 7/024 |

\* cited by examiner

DUAL POLARIZATION RADAR SYSTEMS AND METHODS

CROSS REFERENCE TO RELATED APPLICATION

This application claims priority to U.S. Provisional Application No. 62/173,232, entitled "Dual Polarization Radar Systems and Methods" and filed on Jun. 9, 2015, which is incorporated herein by reference.

RELATED ART

A dual polarization radar system transmits and measures the reflectivity of at least two waveforms, often a horizontally polarized waveform and a vertically polarized waveform. The difference between the horizontal reflectivity ($Z_H$), which is a measure of the reflected power in the horizontally polarized return, and the vertical reflectivity ($Z_V$), which is a measure of the reflected power in the vertically polarized return, is indicative of the shape of the radar target from which the waveforms are reflected, and this difference, referred to as "differential reflectivity" or "$Z_{DR}$," can be used to discern the type of meteorological scatterer, such as rain, sleet, hail, or snow or non-meteorological scatterers such as birds and insects.

In the transmit path, a power divider divides a high-power transmit signal to form the vertically polarized waveform and the horizontally polarized waveform. Ideally, it is desirable for the two waveforms output from the divider to have the same power, phase, and frequency. However, practically, there is some difference between the power levels of the vertically polarized waveform and the horizontally polarized waveform, and the system must be calibrated to account for this difference. The calibration process is complex, and depending on the calibration process used, the system may be unable to collect data during the calibration. In addition, the components required to divide power and perform calibration are typically expensive. Techniques for generally reducing the complexity and costs of the system are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to dual polarization radar systems and methods. Rather than transmitting a vertically polarized waveform and a horizontally polarized waveform, a dual polarized radar system transmits a waveform having energy polarized in a direction to permit the waveform to be separately received by orthogonally positioned waveguides. Specifically, receivers are able to separately measure a vertically polarized component of the returns and a horizontally polarized component of the returns without requiring the transmitter to divide the transmit signal across polarization angles. Therefore, components for dividing the transmit signal and calibrating the system to account for inaccuracies resulting from such division can be eliminated, thereby reducing the complexity and cost of the radar system.

Figure 1:
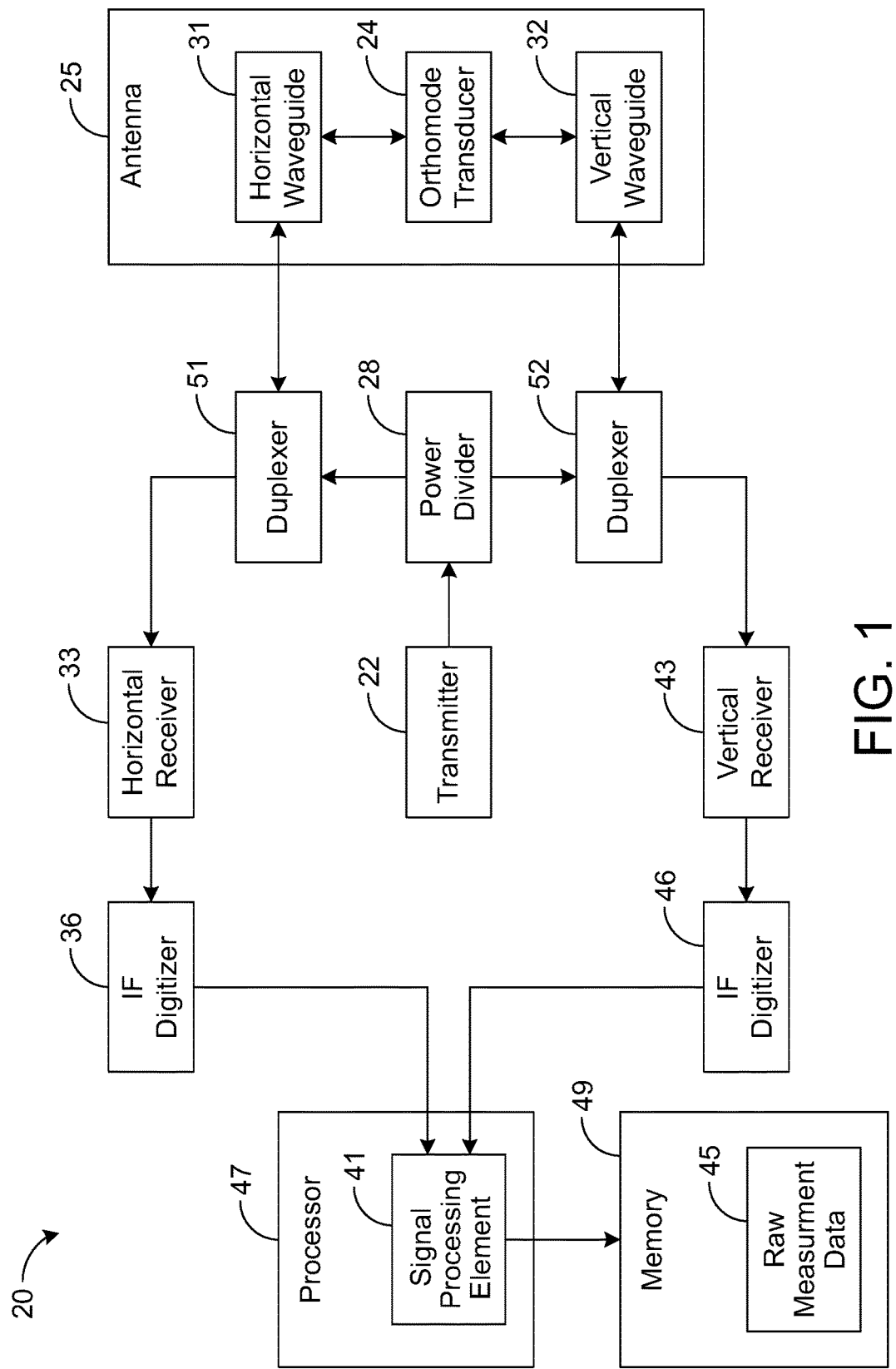
FIG. 1 is a block diagram illustrating a conventional dual polarization radar system.

FIG. 1 depicts a conventional dual polarization radar system 20 for transmitting and receiving returns from a vertically polarized waveform and a horizontally polarized waveform. As shown by FIG. 1, the system 20 comprises a transmitter 22 that generates pulses to be wirelessly transmitted from an orthomode transducer 24 of an antenna 25. Each pulse passes through a power divider 28 that divides the power, thereby providing for each pulse two waveforms, which will be orthogonally polarized by the antenna 25 prior to transmission therefrom.

Figure 2:
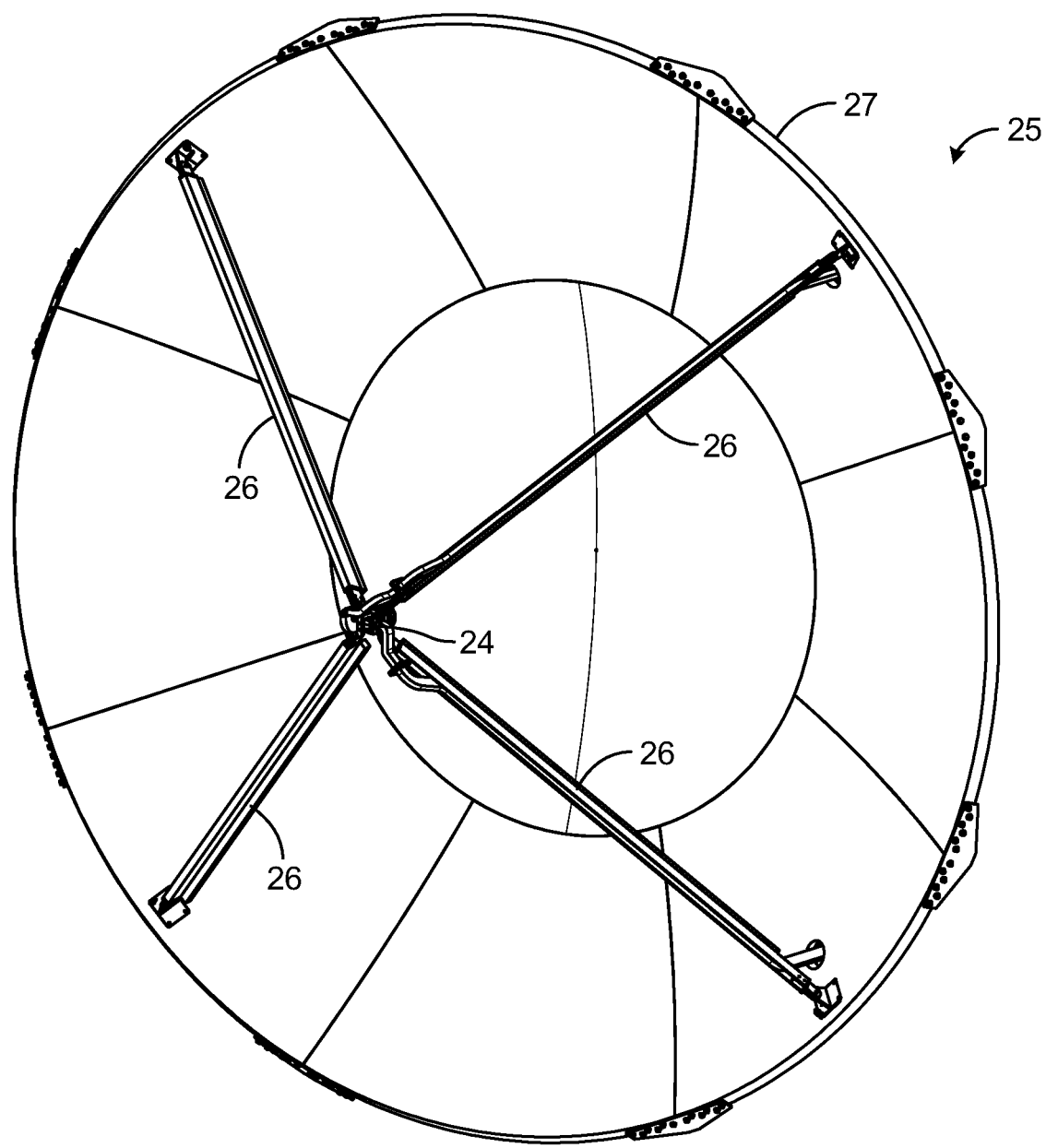
FIG. 2 is a perspective view illustrating an antenna of the dual polarization radar system shown by FIG. 1.
Figure 3:
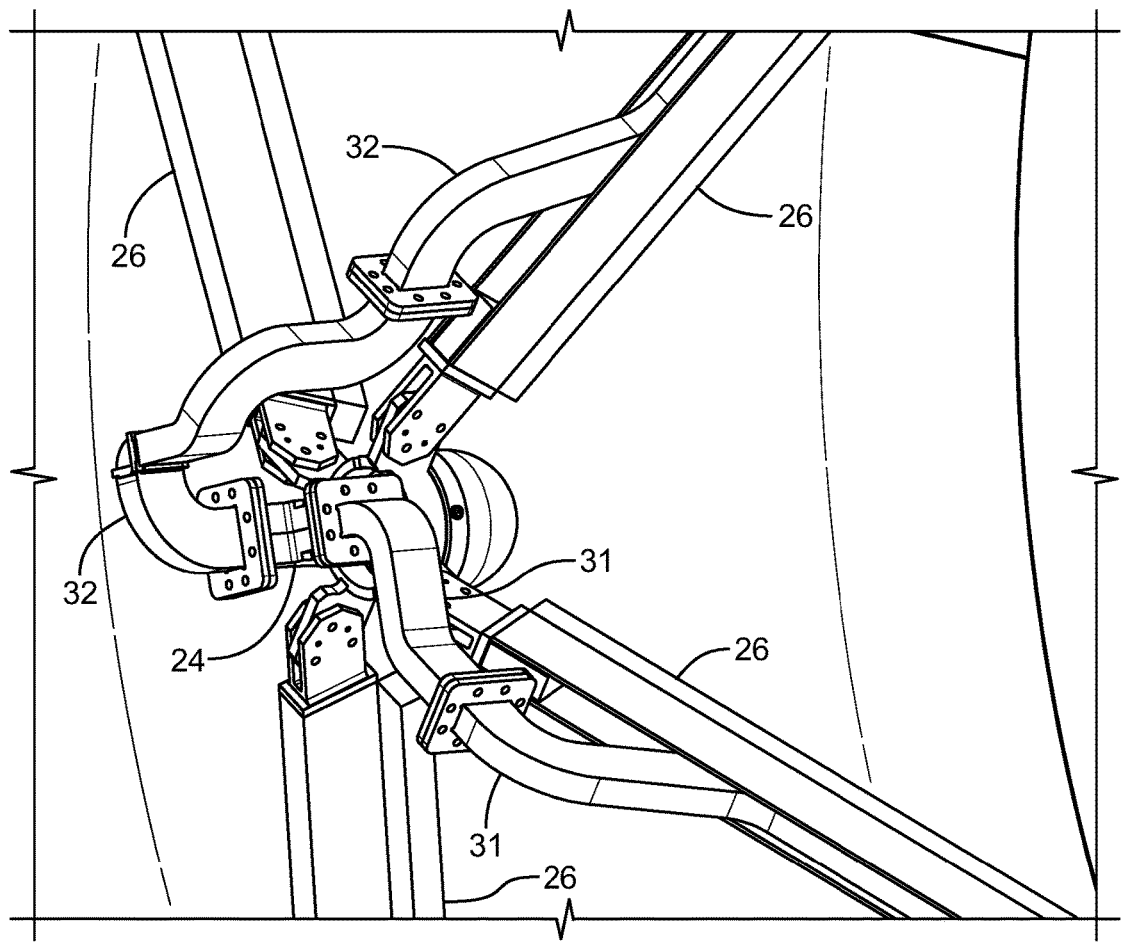
FIG. 3 is a perspective view illustrating horizontal and vertical waveguides of the antenna depicted by FIG. 2.
Figure 4:
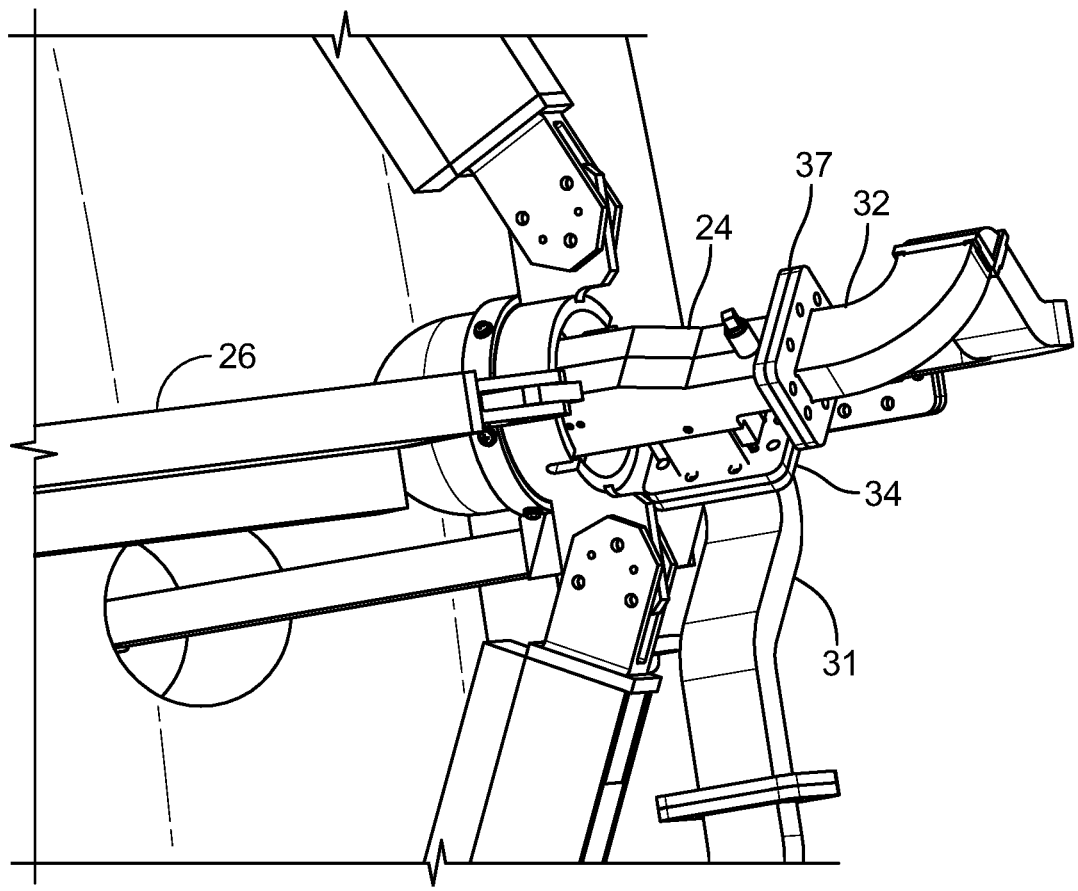
FIG. 4 is a perspective view illustrating an orthomode transducer of the antenna depicted by FIG. 2.

FIG. 2 depicts a conventional antenna 25. As shown by FIGS. 2-4, the orthomode transducer 24 is mounted at ends of a plurality of support arms 26 that extend from a parabolic dish 27. In addition, a waveguide 31, referred to herein as the "horizontal waveguide," for carrying the horizontally polarized waveform is coupled to and extends along one of the support arms 26, and a waveguide 32, referred to herein as the "vertical waveguide," for carrying the vertically polarized waveform is coupled to and extends along another of the support arms 26, as shown. Referring to FIG. 4, the orthomode transducer 24 has a port 34 that is coupled to the horizontal waveguide 31, and the orthomode transducer 24 also has a port 37 that is coupled to the vertical waveguide 32. At the ports 34 and 37, the waveguides 31 and 32 are oriented orthogonally with respect to each other so that the waveform transmitted from the waveguide 31 has an orthogonal polarization relative to the waveform transmitted from the waveguide 32. Specifically, the longitudinal axis of the waveguide 31 (along a centerline of the waveguide 31) at the port 34 is orthogonal relative to the longitudinal axis of the waveguide 32 (along a centerline of the waveguide 32) at the port 37 so that the waveforms carried by the waveguides 31 and 32 are orthogonally polarized with respect to each other in the orthomode transducer 24 and when transmitted from the orthomode transducer 24. The orthogonally polarized waveforms are wirelessly transmitted out of the orthomode transducer 24 in free space toward the dish 27, which reflects the signals. The dish 27 is shaped such that energy from the waveforms is concentrated in a particular direction from the dish 27.

Figure 5:
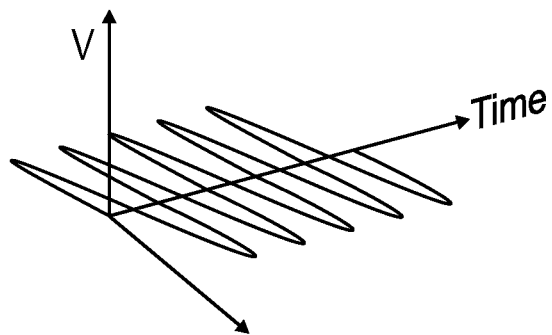
FIG. 5 depicts a graph of electric field versus time for a horizontally polarized waveform transmitted by the antenna of the dual polarization radar system depicted by FIG. 1.
Figure 6:
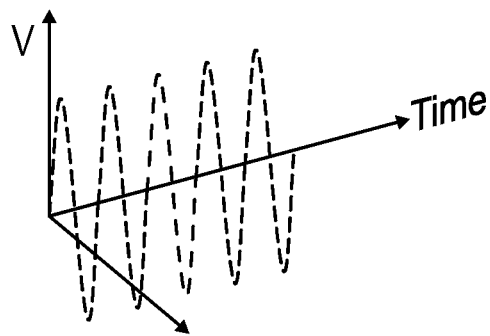
FIG. 6 depicts a graph of electric field versus time for a vertically polarized waveform transmitted by the antenna of the dual polarization radar system depicted by FIG. 1.
Figure 7:
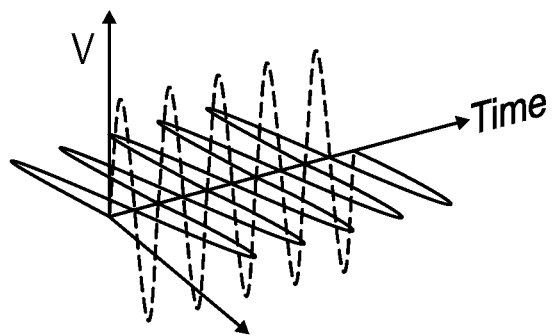
FIG. 7 depicts a graph of electric field versus time for both a vertically polarized waveform and a horizontally polarized waveform transmitted by the antenna of the dual polarization radar system depicted by FIG. 1.

As known in the art, polarization refers to the locus of the tip of the electric field vector observed in a plane orthogonal to the wave normal. FIG. 5 depicts a graph of electric field versus time for a horizontally polarized waveform transmitted by the antenna 25, and FIG. 6 depicts a graph of electric field versus time for a vertically polarized waveform transmitted by the antenna 25. FIG. 7 depicts a graph of electric field versus time for both the vertically polarized waveform and the horizontally polarized waveform transmitted simultaneously.

Ideally, the vertically polarized waveform and the horizontally polarized waveform are transmitted at the same power and thus have the same amplitude. However, practically, there is a slight difference in transmit power causing a slight difference in amplitude, which results in a differential reflectivity bias introduced by the transmit section of the radar system 20.

For each pulse, energy from the vertically polarized waveform and the horizontally polarized waveform propagates from the antenna 25, reflects from objects, such as terrain, buildings, aerial vehicles, and meteorological scatterers (e.g., rain, hail, sleet, or snow), and returns to the antenna 25. Referring to FIG. 1, the horizontal waveguide 31 receives returns of the horizontally polarized waveform, referred to hereafter as "horizontally polarized returns." A receiver 33, referred to hereafter as "horizontal receiver," is configured to measure the horizontally polarized returns received by the horizontal waveguide 31 and to provide an analog signal indicative of the reflected energy measured for the horizontally polarized returns. An intermediate frequency (IF) digitizer 36 is configured to convert the analog signal from the horizontal receiver 33 to a digital signal, which is received by a signal processing element 41.

Similarly, the vertical waveguide 32 receives returns of the vertically polarized waveform, referred to hereafter as "vertically polarized returns." A receiver 43, referred to hereafter as "vertical receiver," is configured to measure the vertically polarized returns received by the vertical waveguide 32 and to provide an analog signal indicative of the reflected energy measured for the vertically polarized returns. An intermediate frequency (IF) digitizer 46 is configured to convert the analog signal from the vertical receiver 43 to a digital signal, which is received by a signal processing element 41.

As shown by FIG. 1, the power divider 28, the horizontal receiver 33, and the horizontal waveguide 31 are coupled to a duplexer 51 that permits bi-directional communication by isolating the horizontal receiver 33 and the transmitter 22 so that they can share the antenna 25. The duplexer 51 may comprise a circulator, but other types of duplexers may be used.

Similarly, the power divider 28, the vertical receiver 43, and the vertical waveguide 32 are coupled to a duplexer 52 that permits bi-directional communication by isolating the vertical receiver 43 and the transmitter 22 so that they can share the antenna 25. The duplexer 51 may comprise a circulator, but other types of duplexers may be used.

The signal processing element 41 is configured to store data 45, referred to herein as "raw measurement data," indicative of the raw measurements of the vertically and horizontally polarized returns. Such raw measurement data 45 is stored in memory 49, such as a database. In one exemplary embodiment, the data 45 is separated into bins in which each bin corresponds to a specific geographic region along a particular azimuth and elevation within the range of the system 20, as described further in U.S. patent application Ser. No. 13/441,419, entitled "Systems and Methods for Calibrating Dual Polarization Radar Systems" and filed on Apr. 6, 2012, which is incorporated herein by reference. However, raw measurement data 45 may be stored according to other techniques in other embodiments. In the system 20 depicted by FIG. 1, the signal processing element 41 is implemented in software that is stored in and executed by a processor 47.

The signal processing element 41 is configured to perform a calibration on the raw data 45 thereby adjusting the data values in order to compensate for various errors introduced by the system 20, including errors introduced by the power divider 28. Such calibration adds undesirable costs and complexities.

Figure 8:
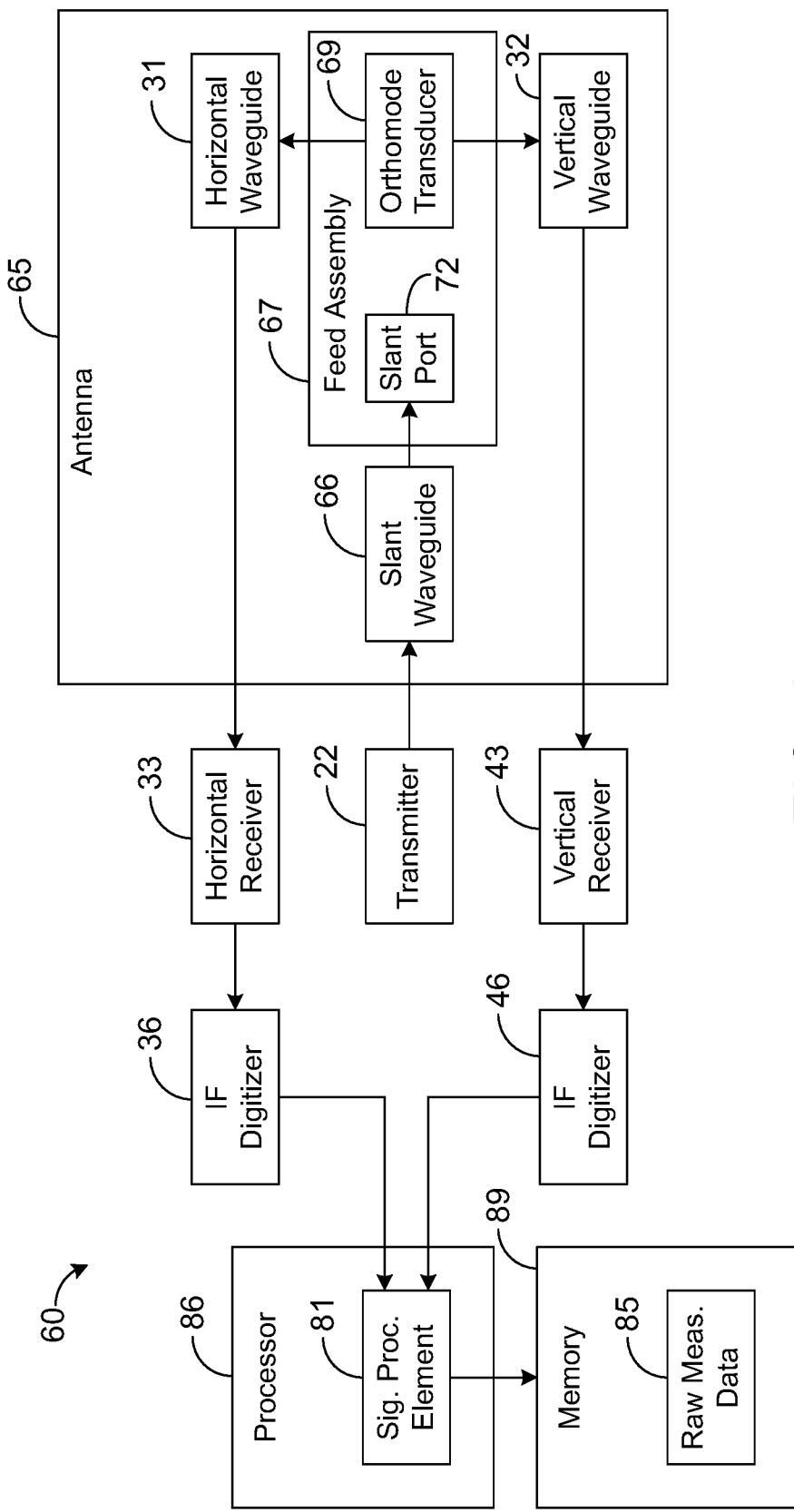
FIG. 8 is a block diagram illustrating an exemplary embodiment of a dual polarization radar system.

FIG. 8 depicts an exemplary embodiment of a dual polarization radar system 60 in accordance with the present disclosure. Except as otherwise described herein, the radar system 60 is configured and operates the same as that described above for the conventional system 20 shown by FIG. 1.

The system 60 of FIG. 8 is configured to transmit a waveform having a component capable of being received by the horizontal receiver 33 and a component capable of being received by the vertical receiver 43. Thus, as can be seen by comparing FIG. 8 to FIG. 1, the system 20 does not require the power divider 28 and the duplexers 51 and 52 shown by FIG. 1. As will be described in more detail hereafter, the duplexing functions provided by the duplexers 51 and 52 are essentially provided by the antenna feed based on polarization. Eliminating the duplexers not only reduces the costs of the system but it also eliminates a source of attenuation in both the transmit and receive paths thereby improving signal quality.

As shown by FIG. 8, an antenna 65 of the system 60 has a feed assembly 67 that is coupled to the transmitter 22 and the receivers 33 and 43. The receive paths of the system 60 may be the same as the receive paths of the conventional system 20 depicted by FIG. 1. Specifically, the antenna 65 comprises a horizontal waveguide 31 and a vertical waveguide 32 that are oriented orthogonally with respect to each other and coupled to ports of an orthomode transducer 69, as described above for the system 20 depicted by FIG. 1. Like the conventional antenna 25 of FIG. 2, the antenna 65 has a parabolic dish 25 to which the feed assembly 67 directs signals transmitted by the antenna 65 and from which the feed assembly 67 receives signals that are received by the antenna 65. As an example, the feed assembly 67 may be positioned at the same location as the orthomode transducer 24 in FIG. 2. That is, the feed assembly 67 may essentially replace the orthomode transducer 24 of FIG. 2.

Referring to FIG. 8, the transmitter 22 is coupled to a waveguide 66, referred to hereafter as "slant waveguide," that is oriented non-orthogonally with respect to both the horizontal waveguide 31 and the vertical waveguide 32, as will be described in more detail below. Specifically, the slant waveguide 66 is coupled to a port 72, referred to hereafter as "slant port," of the feed assembly 67 such that the waveform propagating through the slant waveguide 66 is directed to the antenna's parabolic dish 27. Note that each waveguide 31, 32, and 66 may be a hollow structure through which an electrical signal passes. In one exemplary embodiment, each waveguide 31, 32, and 66 has a cross-sectional shape that is rectangular, but other shapes are possible in other embodiments. For each waveguide 31, 32, and 66, a signal propagates through space within the walls of the waveguide, and the walls of the waveguide generally guide the signal along the path of the waveguide.

Figure 9:
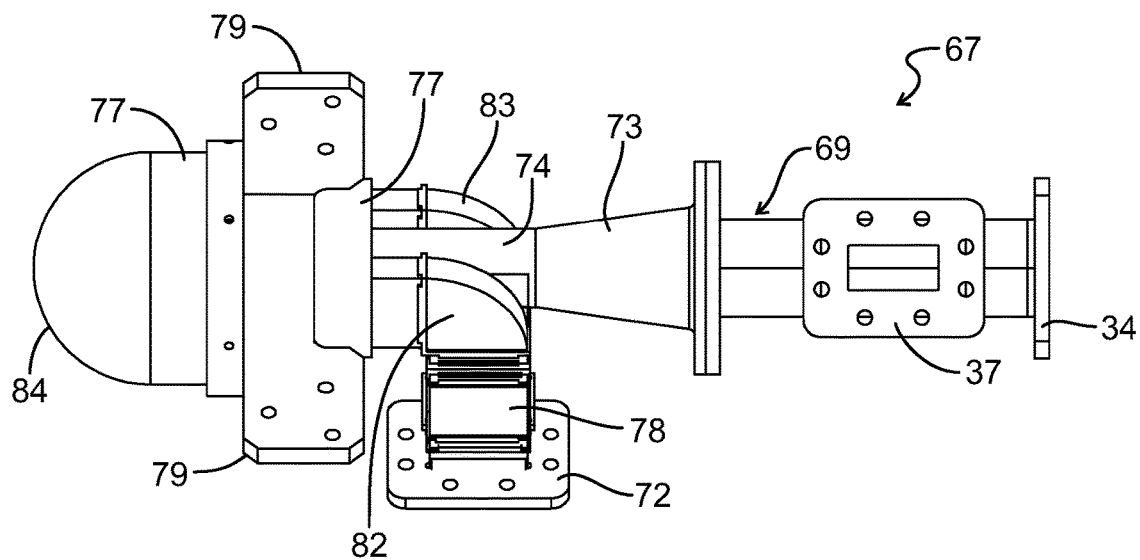
FIG. 9 is a side view illustrating an exemplary embodiment of a feed assembly, such as is depicted by FIG. 8.
Figure 10:
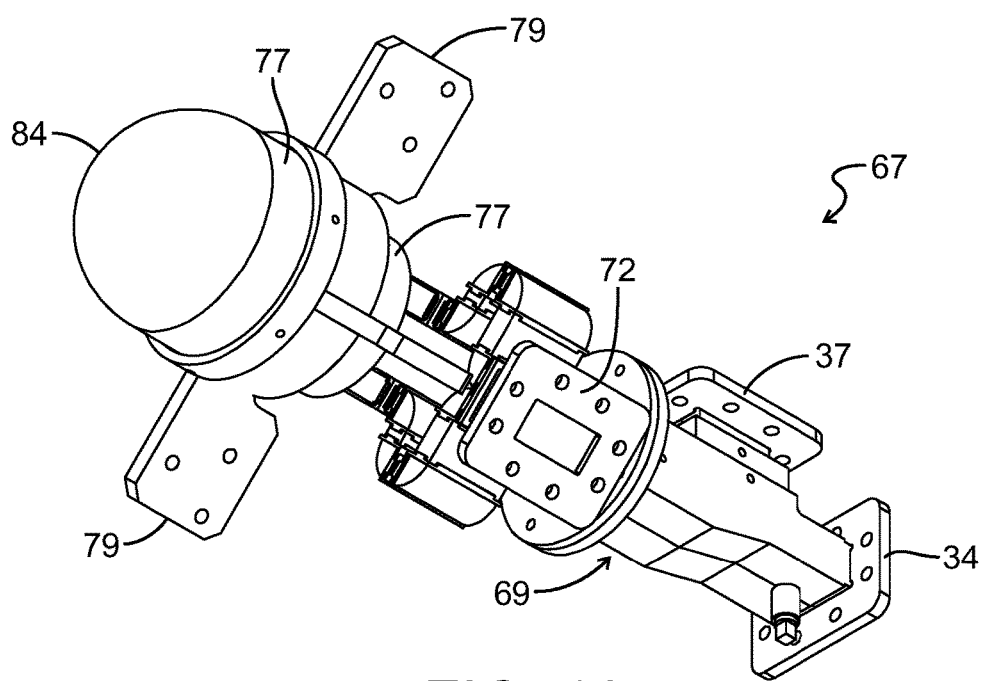
FIG. 10 is a perspective view of the feed assembly depicted by FIG. 9.
Figure 11:
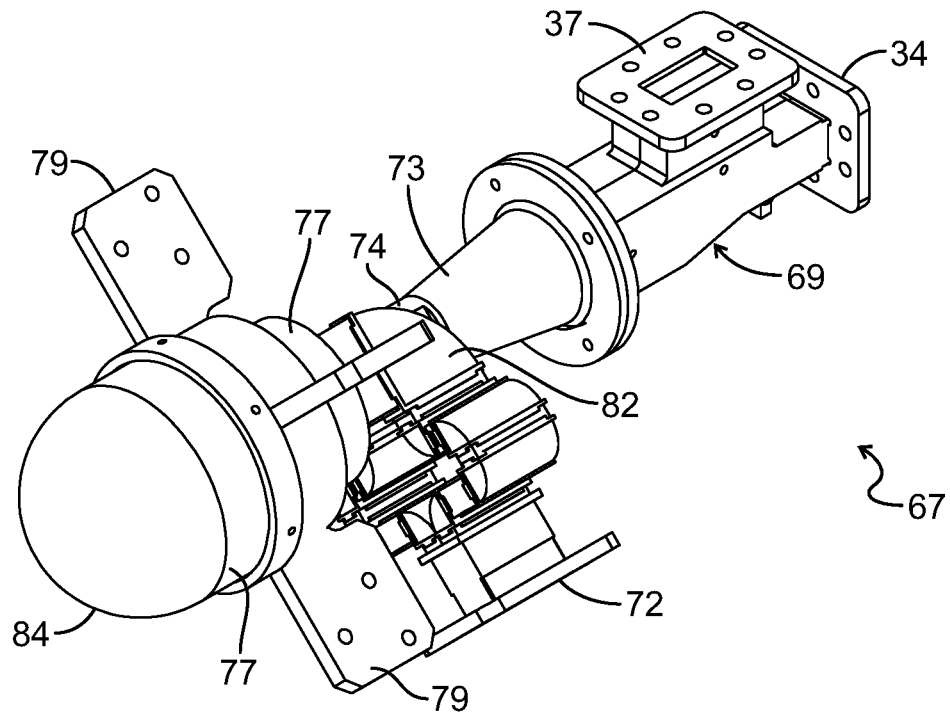
FIG. 11 is a perspective view of the feed assembly depicted by FIG. 9.
Figure 12:
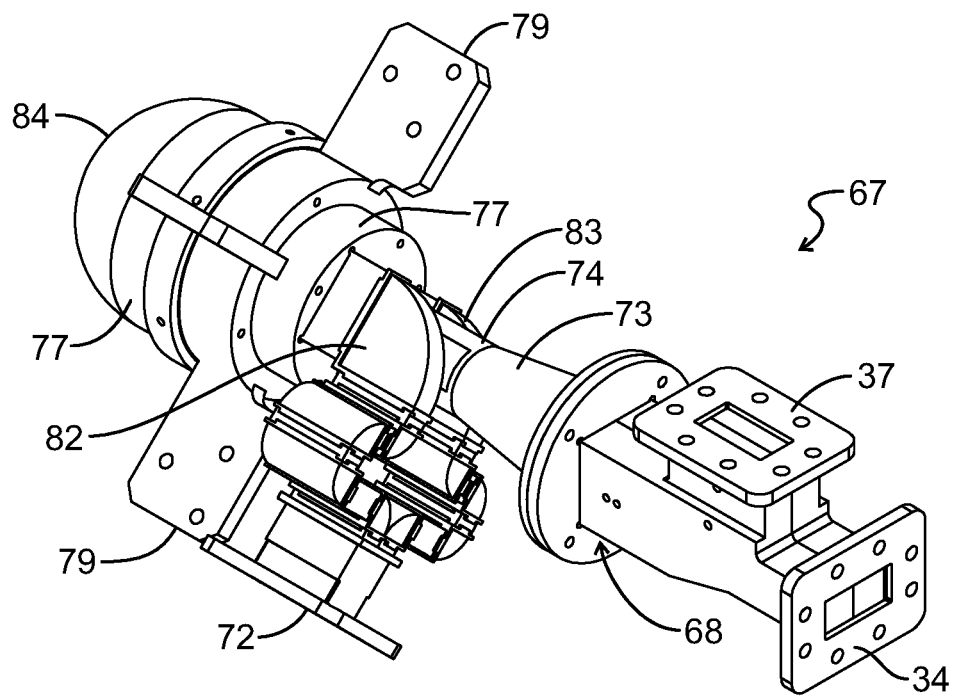
FIG. 12 is a perspective view of the feed assembly depicted by FIG. 9.
Figure 13:
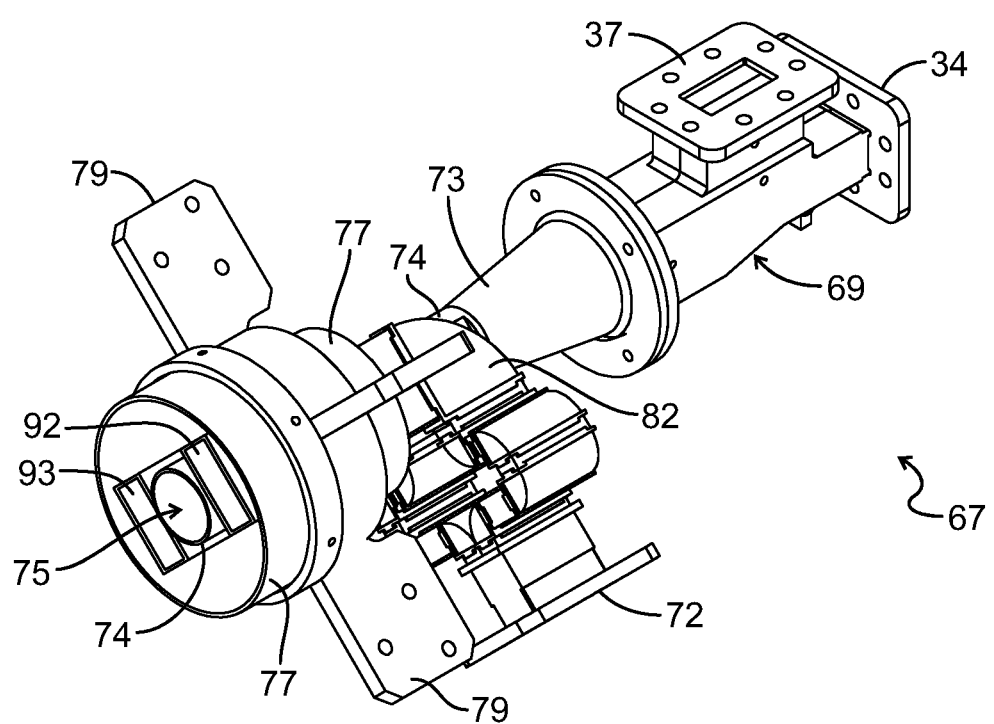
FIG. 13 is a perspective view of the feed assembly depicted by FIG. 9.

In one exemplary embodiment, the orthomode transducer 69 of the feed assembly 67 is similar to the conventional orthomode transducer 24 shown in FIGS. 2-4. Specifically, referring to FIG. 9, the orthomode transducer 69 has a port 34, referred to hereafter as "horizontal port," coupled to the horizontal wave waveguide 31 and a port 37, referred to hereafter as "vertical port," coupled to the vertical waveguide 32. Further, the slant port 72 for the slant waveguide 66 is oriented such that the slant waveguide 66 has a longitudinal axis (along a centerline of the waveguide 66) that is oriented at an acute angle at said port 72 with respect to the longitudinal axis of the horizontal waveguide 31 at the horizontal port 34 and also at an acute angle with respect to the longitudinal axis of the vertical waveguide 32 at the vertical port 37. In one exemplary embodiment, the slant waveguide 66 is oriented at 45 degrees at the slant port 72 with respect to both the horizontal waveguide 31 and the vertical waveguide 32 at the ports 34 and 37, respectively. Specifically, the waveform carried by the slant waveguide 66 enters the feed assembly 67 (1) at a 45 degree angle relative to the direction that the waveform carried by the horizontal waveguide 31 exits the feed assembly 67 and, more specifically, the orthomode transducer 69 and (2) at a 45 degree angle relative to the direction that the waveform carried by the vertical waveguide 32 exits the feed assembly 67 and, more specifically, the orthomode transducer 69. Thus, the waveform transmitted by the slant waveguide 66 has a component, referred to herein as "horizontal component," having a polarization equal to that of the energy received by the horizontal waveguide 33, and the waveform transmitted by the slant waveguide 66 also has another component, referred to herein as the "vertical component," having a polarization equal to that of the energy received by the vertical waveguide 43. Therefore, the horizontal receiver 33 receives and measures the horizontal component of a return from the transmit waveform, and the vertical receiver 43 receives and measures the vertical component of the same return.

Note that, by selecting the polarization of the transmit waveform to be at an angle that is about halfway between the polarization of the energy received by the horizontal waveguide 33 and the polarization of the energy received by the vertical waveguide 43, very little bias is introduced by the transmit path since the power of the horizontal component transmitted from the antenna 65 should be substantially equal to the power of the vertical component transmitted from the antenna so that calibration for power differences is unnecessary. Since a power divider 28 (FIG. 1) is not used to split the transmit waveform and duplexers 51 and 52 (FIG. 1) are not needed to isolate the transmitter 22 from the receivers 33 and 43, the overall cost and complexity of the system 60 can be significantly reduced relative to the conventional system 20 depicted by FIG. 1.

In addition, it should also be noted that the slant waveguide 66 may be oriented such that its polarization is at some angle other than halfway between the polarizations of the horizontal and vertical waveguides 31 and 32. As an example, the slant waveguide 66 may be oriented such that its longitudinal axis at the slant port 72 of the transducer 69 is at an angle smaller than 45 degrees with respect to the longitudinal axis of either of the horizontal or vertical waveguides 31 or 32 at the ports 34 or 37, respectively. In such an embodiment, the power of the horizontal and vertical components received by the horizontal and vertical waveguides 31 and 32 may be unequal. In such case, calibration may be desired in order to account for this power difference. As an example, the calibration techniques described in U.S. patent application Ser. No. 13/441,419 may be used. However, the need of such calibration can be eliminated by ensuring that the slant waveguide 66 is oriented at angle that is about halfway between the horizontal waveguide 31 and the vertical waveguide 32, as described above.

FIGS. 9-13 show an exemplary embodiment of the feed assembly 67. As shown, the feed assembly 67 has a waveguide 74 that is circular and shall be referred to hereafter as the "receive waveguide." In other embodiments, a non-circular shape (e.g., rectangular) is possible. The waveguide 74 is essentially a hollow pipe having a circular cross-sectional area. One end of the waveguide 74 that is held within a base 77 of the feed assembly 67 is open, thereby forming an aperture 75 (FIG. 13) for receiving energy reflected by the antenna's parabolic dish 27.

The opposite end of the waveguide 74 is coupled to a tapered waveguide 73, referred to hereafter as the "waveguide transformer," which is coupled to the orthomode transducer 69. The waveguide transformer 73 is essentially a hollow pipe that is larger at the end coupled to the orthomode transducer 69 than at the end coupled to the receive waveguide 74, though other shapes of the waveguide transformer 73 are possible. In one embodiment, the receive path is transitioned from a circular to a rectangular path at the interface between the waveguide transformer 73 and the orthomode transducer 69. Returns from the transmit waveform are received through the aperture 75 and are carried by the receive waveguide 74 and the waveguide transformer 73 to the orthomode transducer 69.

In the exemplary embodiment shown by FIGS. 9-13, a waveguide 78, referred to hereafter as "transmit waveguide," extends from the slant port 72 to the base 77. The transmit waveguide 78 bends approximately 90 degrees so that the transmit waveform passes through the base 77 in a direction parallel to the direction of propagation of the returns passing through the receive waveguide 73. Further, the transmit waveguide 78 has two sections 82 and 83 that are located on opposite sides of the receive waveguide 73 within the base 77. An end of the section 82 is open, thereby forming an aperture 92 through which energy of the transmit waveform egresses toward the parabolic dish 27, and an end of the section 83 is open, thereby forming an aperture 93 through which energy of the transmit waveform egresses toward the parabolic dish 27. Note that, in one embodiment, the base 77 forms a hollow cylinder that houses ends of the receive waveguide 74 and the sections 82 and 83, though other shapes of the base 77 are possible in other embodiments.

The transmit waveform that enters the transmit waveguide 78 through the slant port 72 is separated by the transmit waveguide 78 such that a portion of the transmit waveform passes through the section 82 and a portion of the transmit waveform passes through the section 83. In one exemplary embodiment, the sections 82 and 83 are of approximately the same size such that approximately half of the energy of the transmit signal propagates through each section 82 and 83, but other ratios are possible in other embodiments. By separating the transmit waveform as described, the energy of the transmit waveform is distributed symmetrically about the aperture 75 of the receive waveguide 74. In other embodiments, such symmetry and separation of the transmit waveform is unnecessary.

As shown by FIGS. 9-13, the base 77 is coupled to a cover 84 that has a semispherical shape, but other shapes of the cover 84 are possible. As shown, a bracket 79 is used to couple the base 77 to the support arms 26 of the antenna 65.

Each pulse transmitted by the transmitter 22 is carried by the slant waveguide 66 to the port 72 of the feed assembly 67. The pulse passes through the transmit waveguide 78 which divides the pulse and directs it through the cover 84 to the parabolic dish 27 of the antenna 65. Energy from the pulse reflects from objects, such as terrain, buildings, aerial vehicles, and meteorological scatterers (e.g., rain, hail, sleet, or snow), and returns to the antenna 65. The parabolic dish 27 focuses energy of the returns at the aperture 75 of the receive waveguide 74, and the returns pass through the receive waveguide 74 and the waveguide transformer 73. The orthomode transducer 67 separates each return into its horizontally polarized component (also referred to herein as "horizontal component") and its vertically polarized component (also referred to herein as "vertical component"). The horizontal waveguide 31 receives the horizontal component of the return, and the vertical waveguide 32 receives the vertical component of the return. A horizontal receiver 33 is configured to measure the horizontal component carried by the horizontal waveguide 31 and to provide an analog signal indicative of the reflected energy measured for the horizontal component. An intermediate frequency (IF) digitizer 36 is configured to convert the analog signal from the horizontal receiver 33 to digital signals, which are received by a signal processing element 81.

Similarly, the vertical waveguide 32 receives the vertical component of the return, and a vertical receiver 43 is configured to measure the vertical component carried by the vertical waveguide 32 and to provide an analog signal indicative of the reflected energy measured for the vertical component. An intermediate frequency (IF) digitizer 46 is configured to convert the analog signal from the vertical receiver 43 to digital signals, which are received by the signal processing element 81.

The signal processing element 81 is configured to store raw measurement data 85 indicative of the raw measurements of the vertically and horizontally polarized returns. Such raw measurement data 85 is stored in memory 49. In one exemplary embodiment, the format of the raw measurement data 85 is similar to that of the raw measurement data 45 described above for the system 20 depicted by FIG. 1, but it is unnecessary for the signal processing element 81 to calibrate the data 85 in order to compensate for errors in the transmit path, as is done for the data 45 of FIG. 1, since there is no power division in the transmit path across polarization angles that would otherwise introduce error. Note that the signal processing element 81 may be implemented in software, firmware, hardware, or any combination thereof. In one exemplary embodiment, the signal processing element 81 is implemented in software that is stored in and executed by a processor 86, but other configurations of the signal processing element 81 are possible in other embodiments.

Figure 14:
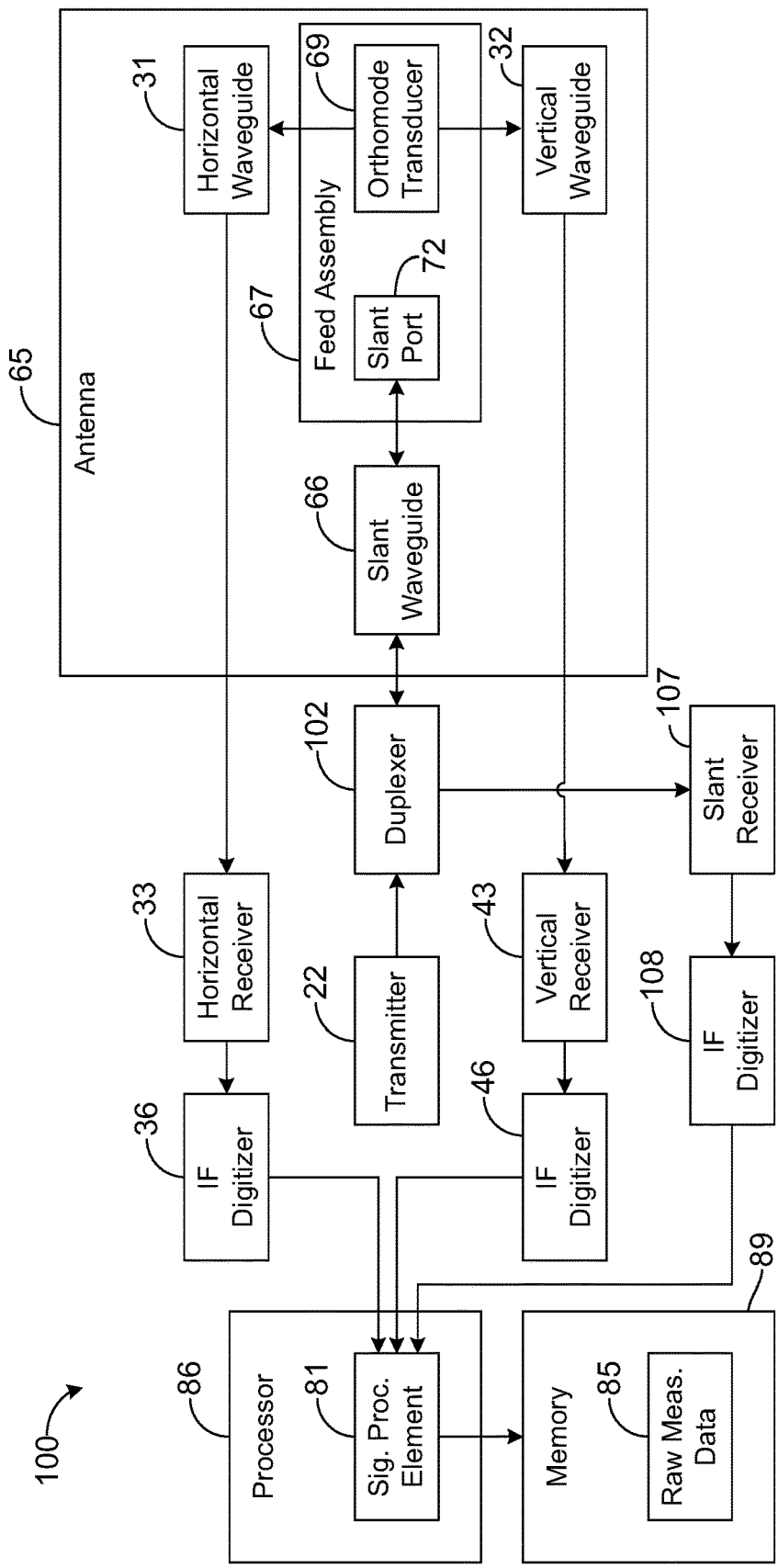
FIG. 14 is a block diagram illustrating another exemplary embodiment of a dual polarization radar system.

FIG. 14 depicts another exemplary embodiment of a dual polarization system 100. The system 100 of FIG. 14 is the same as the system 60 shown by FIG. 8, except that the system 100 includes a duplexer 102 and an additional receive path that comprises a receiver 107, referred to herein as the "slant receiver," and an IF digitizer 108. The slant waveguide 66 receives returns from the transmit waveform that is transmitted by the slant waveguide 66, and the slant receiver 107 measures these returns. As shown by FIG. 14, the slant waveguide 66 is coupled to the duplexer 102, which is configured to block the transmit waveform from being received by the slant receiver 107 while permitting the returns to pass and be received by the slant receiver 107. Thus, the duplexer 102 helps to prevent interference between the transmit waveform and the returns received by the slant receiver 107. The duplexer 102 may comprise a circulator, but other types of duplexers may be used.

The slant receiver 107 provides an analog signal indicative of the returns measured by it, and the IF digitizer 108 is configured to convert the analog signal from then slant receiver 66 to a digital signal, which is received by a signal processing element 81. Thus, the raw measurement data 85 includes measurements by the receivers 33, 43, and 107. The additional data provided by the slant receiver 107 may help to provide more information about the scatterers from which the energy of the transmit waveform reflects.

In the exemplary embodiments described above, the slant waveguide 66 transmits a waveform having a polarization that is oriented at an angle that is about halfway between the polarizations of the energy received by the horizontal and vertical waveguides 31 and 32. However, in other embodiments, other types of waveforms may be transmitted that are capable of being received by both of the horizontal and vertical waveguides 31 and 32.

As an example, in one exemplary embodiment, a dual polarization radar system is configured to transmit a circularly polarized waveform such that the horizontal waveguide 33 should receive about the same amount of power from a return as the vertical waveguide 43. Note that there are various techniques that can be used to generate a circularly polarized waveform.

Figure 15:
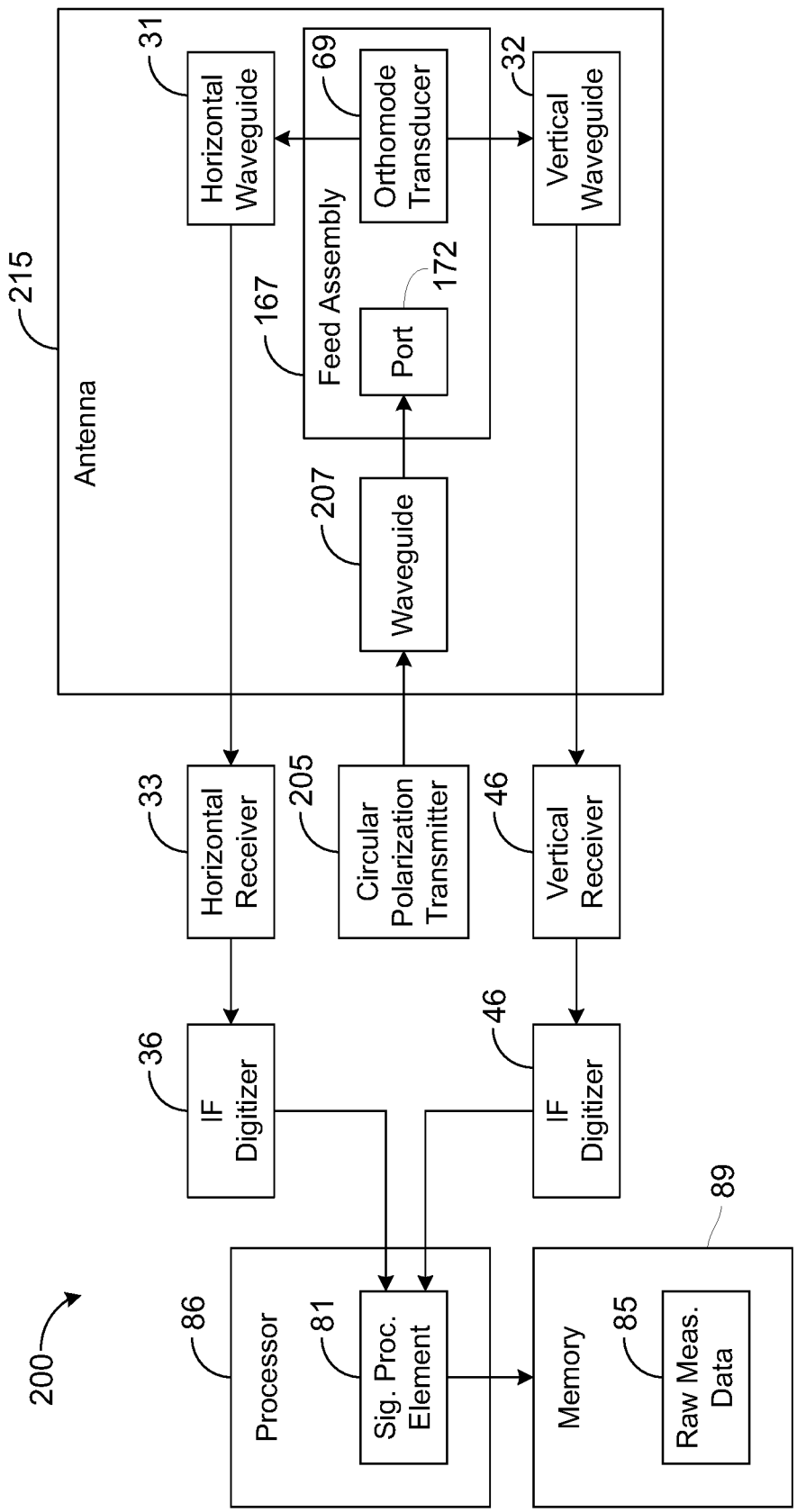
FIG. 15 is a block diagram illustrating yet another exemplary embodiment of a dual polarization radar system.

FIG. 15 depicts an exemplary embodiment of a dual polarization radar system 200 that transmits a circularly polarized waveform for which returns are capable of being received by both horizontal and vertical waveguides 31 and 32. Referring to FIGS. 15 and 8, the system 200 is configured and operates the same as the system 60 shown by FIG. 8, except as will be described in more detail herein. In this regard, the system 200 has a circular polarization transmitter 205 that is configured to transmit a circularly polarized waveform. A waveguide 207 guides pulses from the transmitter 205 to a port 172 of a feed assembly 167 that directs the pulses toward the parabolic dish of an antenna 215, which concentrates the energy of each pulse into a given direction from the antenna 215. Note that it is unnecessary for the waveguide 207 to be oriented in any particular direction at the port 172 relative to the horizontal and vertical waveguides 31 and 32 at ports of the feed assembly 167.

Returns of each pulse are received by an orthomode transducer 69 coupled to horizontal and vertical waveguides 31 and 32. Specifically, a horizontal component of a return of the circularly polarized waveform is received by the horizontal waveguide 31, which guides energy of such horizontal component to a horizontal receiver 33, and a vertical component of the same return is received by the vertical waveguide 32, which guides energy of such vertical component to a vertical receiver 43. Measurements of the horizontal and vertical components may be processed in the same way as described above for the embodiment depicted by FIG. 8.

An exemplary operation and use of the system 60 will now be described in more detail below with particular reference to FIG. 16.

Figure 16:
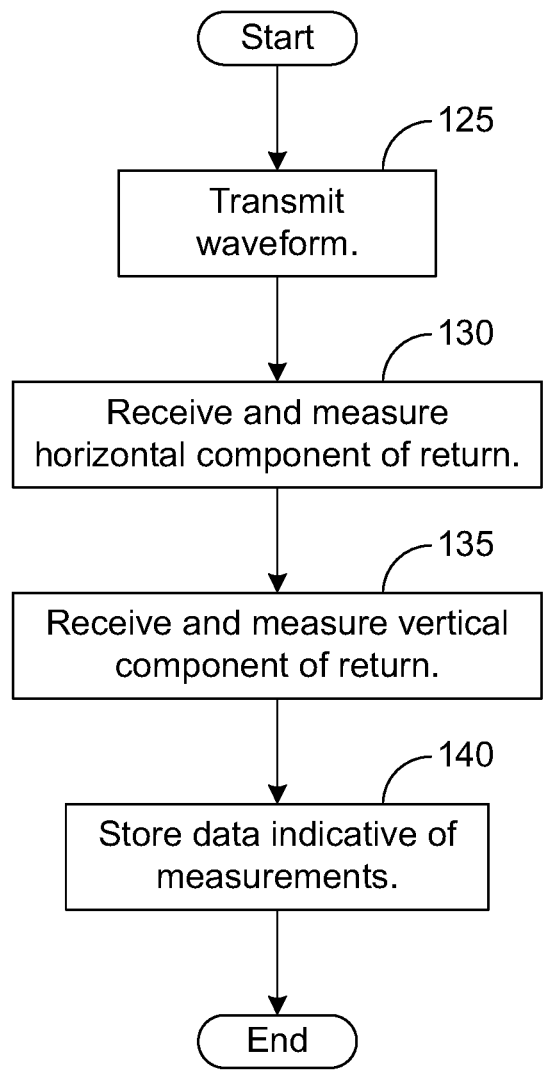
FIG. 16 is a flow chart illustrating an exemplary method for making measurements in a dual polarization radar system, such as is depicted by FIG. 8.

As shown by block 125 of FIG. 16, the transmitter 22 (FIG. 6) generates a pulse of high power that is guided by the slant waveguide 66. Notably, there is no need to divide the power of the pulse in order to provide for transmission of a horizontally polarized waveform and a vertically polarized waveform. Instead, a waveform having energy polarized in a direction that allows the waveform to be received by orthogonally-positioned waveguides 31 and 32 is wirelessly transmitted from the antenna 65. In one example, this waveform has a polarization that is oriented at an angle halfway between the polarization of the energy received by the horizontal waveform 31 and the polarization of the energy received by the vertical waveform 32. In another example, the waveform has a circular polarization. Yet other types of polarization are possible in other embodiments.

As shown by block 130 of FIG. 16, the horizontal waveguide 31 receives a horizontal component of the return of the pulse originally transmitted from the slant waveguide 66. The horizontal receiver 33 measures the horizontal component and provides an analog signal indicative of this measurement. The IF digitizer 36 converts the analog signal to a digital value that is stored as part of the raw measurement data 85, as shown by block 140 of FIG. 16.

As shown by block 135 of FIG. 16, the vertical waveguide 32 receives a vertical component of the return of the pulse originally transmitted from the slant waveguide 66. The vertical receiver 43 measures the vertical component and provides an analog signal indicative of this measurement. The IF digitizer 46 converts the analog signal to a digital value that is stored as part of the raw measurement data 85, as shown by block 140 of FIG. 16. The process shown by FIG. 16 may be repeated for each pulse transmitted by the system 60.

Now, therefore, the following is claimed:

1. A dual polarization radar system, comprising:
   a transmitter for generating a pulse;
   a first receiver;
   a second receiver; and
   an antenna having a first waveguide, a second waveguide, a third waveguide, and a feed assembly, the first waveguide coupled to the first receiver and to a first port of the feed assembly, the second waveguide coupled to the second receiver and to a second port of the feed assembly, the third waveguide coupled to a third port of the feed assembly and to the transmitter for guiding the pulse generated by the transmitter such that the pulse is wirelessly transmitted from the antenna, wherein the first and second waveguides are oriented orthogonally with respect to each other such that (1) the first waveguide is configured to receive a vertical component of a return of the pulse and (2) the second waveguide is configured to receive a horizontal component of the return, wherein the vertical component has a polarization orthogonal to a polarization of the horizontal component, wherein the first receiver is configured to measure the vertical component of the pulse, and wherein the second receiver is configured to measure the horizontal component of the pulse.

2. The system of claim 1, further comprising a signal processing element configured to store in memory a first value indicative of a measurement of the vertical component and a second value indicative of a measurement of the horizontal component.

3. The system of claim 1, wherein the third waveguide at the third port is oriented non-orthogonally with respect to the first and second waveguides at the first and second ports, respectively, such that the pulse has a polarization between the polarization of the vertical component and the polarization of the horizontal component.

4. The system of claim 1, wherein the pulse wirelessly transmitted from the antenna has a circular polarization.

5. The system of claim 1, wherein the third waveguide is oriented relative to the first and second waveguides such that a power of the vertical component is substantially equal to a power of the horizontal component when the pulse is wirelessly transmitted from the antenna.

6. A dual polarization radar system, comprising:
   a transmitter for generating a pulse;
   a first receiver;
   a second receiver; and
   an antenna having a first waveguide, a second waveguide, a third waveguide, and a feed assembly, the first waveguide coupled to the first receiver and a first port of the feed assembly, the second waveguide coupled to the second receiver and a second port of the feed assembly, the third waveguide coupled to a third port of the feed assembly and the transmitter for guiding the pulse generated by the transmitter such that the pulse is wirelessly transmitted from the antenna, wherein the first waveguide at the first port and the second waveguide at the second port are oriented orthogonally with respect to each other, wherein the third waveguide at the third port is oriented non-orthogonally with respect to the first waveguide at the first port and second waveguide at the second port such that (1) the first waveguide is configured to receive a vertical component of a return of the pulse, (2) the second waveguide is configured to receive a horizontal component of the return, and (3) the pulse is polarized non-orthogonally with respect to the vertical and horizontal components, wherein the vertical component has a polarization orthogonal to a polarization of the horizontal component, wherein the first receiver is configured to measure the vertical component of the pulse, and wherein the second receiver is configured to measure the horizontal component of the pulse.

7. The system of claim 6, further comprising a signal processing element configured to store in memory a first value indicative of a measurement of the vertical component and a second value indicative of a measurement of the horizontal component.

8. A method for use in a dual polarization radar system, comprising:
   transmitting a pulse from an antenna of the dual polarization radar system, the antenna having a first waveguide, a second waveguide, a third waveguide, and a feed assembly, wherein the first waveguide is coupled to a first port of the feed assembly, the second waveguide is coupled to a second port of the feed assembly, and the third waveguide is coupled to a third port of the feed assembly;
   receiving a return of the pulse by the antenna;
   transmitting a vertical component of the return through the first waveguide;
   transmitting a horizontal component of the return through the second waveguide;
   measuring the vertical component of the return with a first receiver;

measuring the horizontal component of the return with a second receiver, wherein the horizontal component has a polarization orthogonal to a polarization of the vertical component; and controlling the pulse such that the pulse transmitted from the antenna has a polarization that is non-orthogonal relative to the polarization of the horizontal component and the polarization of the vertical component, wherein the controlling comprises transmitting the pulse through the third waveguide and feed assembly, and wherein the third waveguide at the third port is oriented non-orthogonally relative to the first waveguide at the first port and the second waveguide at the second port.

9. The method of claim 8, further comprising storing in memory data indicative of the measuring the vertical component and storing in the memory data indicative of the measuring the horizontal component.

10. A method for use in a dual polarization radar system, comprising:

transmitting a pulse from an antenna of the dual polarization radar system, the antenna having a first waveguide, a second waveguide, a third waveguide, and a feed assembly, wherein the first waveguide is coupled to a first port of the feed assembly, the second waveguide is coupled to a second port of the feed assembly, and the third waveguide is coupled to a third port of the feed assembly;

transmitting the pulse through the third waveguide to the feed assembly;

receiving a vertical component of a return of the pulse through the first waveguide;

receiving a horizontal component of the return through the second waveguide, wherein the first waveguide at the first port is oriented orthogonally with respect to the second waveguide at the second port such that the horizontal component has a polarization that is orthogonal with respect to a polarization of the vertical component;

measuring the vertical component with a first receiver; and measuring the horizontal component with a second receiver, wherein the third waveguide at the third port is oriented non-orthogonally with respect to the first waveguide at the first port and the second waveguide at the second port such that the pulse transmitted from the antenna has a polarization that is non-orthogonal with respect to the polarization of the vertical component and the polarization of the horizontal component.

11. The method of claim 10, further comprising storing in memory data indicative of the measuring the vertical component and storing in the memory data indicative of the measuring the horizontal component.

* * * * *